Jan. 5, 1926.
C. L. DEWEY
1,568,325
FISH LURE
Filed May 7, 1923
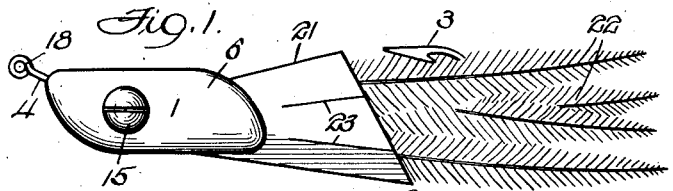
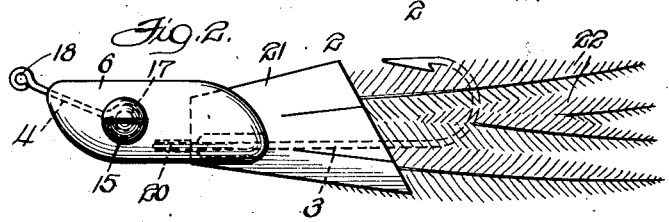
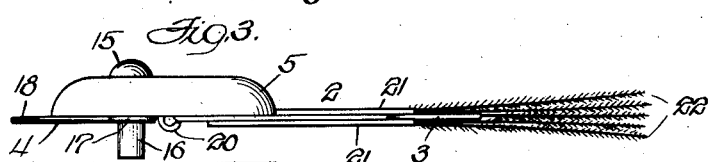
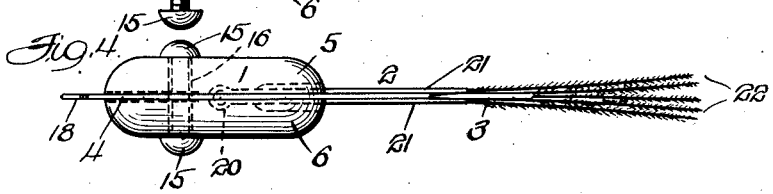
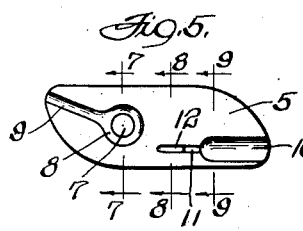
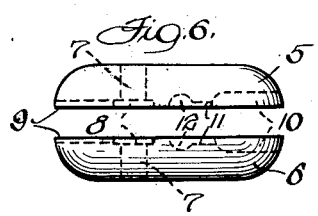
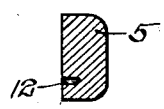
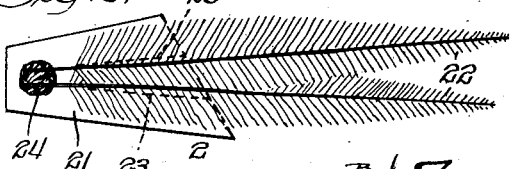
Inventor:
CLARENCE L. DEWEY
By Foree Bain + Hinkle Attys Patented Jan. 5, 1926.

1,568,325

UNITED STATES PATENT OFFICE.

CLARENCE L. DEWEY, OF MICHIGAN CITY, INDIANA.

FISH LURE.

Application filed May 7, 1923. Serial No. 637,403.

*To all whom it may concern:*

Be it known that I, CLARENCE L. DEWEY, a citizen of the United States, residing at Michigan City, in the county of La Porte and State of Indiana, have invented certain new and useful Improvements in Fish Lures, of which the following is a specification.

This invention relates to fish lures.

One of the object of the invention is to provide an improved fish lure.

Another object is to provide a lure which is attractive.

Another object is to provide a lure which may be readily and inexpensively produced in quantity.

Another object is to provide a lure which may be manufactured in great variety by assembling similar body units and various kinds of appendages.

Another object is to provide a lure body which will readily accommodate and anchor ordinary fish hooks.

Another object is to provide improved arrangements for holding the hook and the line attaching eyelet.

Another object is to provide a lure body which may be readily molded.

Other objects and advantages will hereinafter appear.

An embodiment of the invention is illustrated in the accompanying drawing, wherein—

Fig. 1 is a side elevation of the lure.

Fig. 2 is a side elevation showing the unexposed parts in dotted lines.

Fig. 3 is a separated top plan.

Fig. 4 is an assembled top plan showing the unexposed parts in dotted lines.

Fig. 5 is an inside elevation of one of the body units.

Fig. 6 is a top plan of the two body units, the recesses therein being shown in dotted lines.

Fig. 7 is a section on the line 7—7 of Fig. 5.

Fig. 8 is a section on the line 8—8 of Fig. 5.

Fig. 9 is a section on the line 9—9 of Fig. 6, and

Fig. 10 is an assembled elevation of the hook guard.

In general the lure comprises a body 1, a hook guard 2, a hook 3 and a line attaching eyelet 4. Body 1 carries hook guard 2, hook 3 and line attaching eyelet 4.

Body 1 is composed of two complementary sections or body units 5 and 6 which are fitted together side by side. These body units may be shaped to suit the various requirements to be met and may be made of suitable molded material such as cast aluminum, bakelite, or the like. Each unit has a transverse hole 7 therethrough. When the two units are fitted together to form the body their holes 7 align.

The inner end of each hole 7 is enlarged to form a recess 8. An inclined groove or passage 9 is formed in the inner face of each body unit and extends from recess 8 to the upper forward corner of the corresponding unit. Recesses 8 and 9, when the body units are fitted together form a cavity for the line attaching eyelet, as will be hereinafter set forth. Near the lower rear corner each body unit has a groove or recess consisting of an enlarged relatively long rear section 10, a restricted intermediate section 11 and an enlarged substantially semi-circular forward section 12. When the body units are fitted together the complementary groove sections form a cavity whose purpose will be hereinafter described.

The body units are held together by a screw clamp which is composed of two screws 15 and an internally threaded sleeve 16 into which the screws may be turned. Sleeve 16 lies partly in hole 7 of each body unit.

Line attaching eyelet 4 has, on its inner end, a ring 17 which lies in the body cavity formed by recesses 8 and encircles sleeve 16. The shank of eyelet 4 lies in the body cavity formed by the complementary grooves 9 of the two body units. The sleeve and the walls of the cavity securely anchor the line attaching eyelet to the body. Eyelet 4 has a line attaching ring 18 on its exposed end.

Hook 3, which may be of the ordinary type, has its ring 20 seated in the body cavity formed by complementary groove sections 12 and its shank passes through the cavity formed by the complementary intermediate groove sections 11 and rear sections 10. Thus when the two body units are clamped together the hook is securely anchored to the body by the walls of the rear cavity.

Hook guard 2 is composed of two similar fins 21 and trailers 22. Fins 21 may be formed from relatively thin sheets of suitable material, such as celluloid. The fins may be provided in various colors to suit the conditions to be met. The shape of the fins also may be varied. The protection afforded the hook may be increased by locating the upper rear corner of the fins on or slightly above the plane of the point of the hook. The fins may be provided with cuts 23, which will increase their flexibility and insure temporary collapse when a fish strikes the hook.

Trailers 22 may be formed from feathers or other suitable material. Feathers, for example, may be secured to fins 21 by pasting the shafts thereof to the surface of the fins by drops 24 of shellac or other suitable binder. Two feathers on each fin have been found to give excellent results. The shank of the hook may then lie between the shafts of the feathers on each fin and thus assist in holding the fins and trailers in proper position.

The lure may be assembled by placing a sleeve 16, into which a screw 15 has been turned, through a hole 7 of a body unit. The line attaching eyelet may then be applied with its ring about sleeve 16 and in recess 7 and its shank in groove 9. One fin 21 and its trailers 22 may be placed upon the body unit and then the hook applied with its ring in recess 12. The other fin and trailer is then placed and the other body unit and its screw 15 applied. Ordinarily the better practice with feather trailers is to place the fins so that the shafts of the feathers secured thereto are toward the hook. By the use of contrasting colors for the body units and screws 15, the screws may simulate eyes in the body of the lure.

Having described my invention what I claim as new and desire to secure by Letters Patent, is:—

1. A fish lure having a body comprising two complementary units, a hook and a hook guard located between the units, said guard being flexible and having its greater transverse dimension in a plane parallel with the hook and means to clamp the sections together about the parts.

2. A fish lure having a hook guard comprising two fins of flexible sheet material and a trailer secured thereto; a hook; a line attaching eyelet; a body comprising two recessed units which fit together and provide cavities for parts of the hook and eyelet; and a screw clamp passing through the units and serving to hold the same together and thereby anchor the hook, eyelet and hook guard thereto.

3. A fish lure comprising two complementary recessed units which fit together to form a substantially rigid body, a line attaching eyelet having a shank which extends into the body, a hook having a shank which extends into the body, a hook guard of flexible sheet material which lies along the shank of the hook, and a clamp which passes through the units and the shank of the line attaching eyelet and serves to anchor the line attaching eyelet to the body and to clamp the units together with the hook guard therebetween.

In testimony whereof I hereunto subscribe my name.

CLARENCE L. DEWEY.